United States Patent [19]
Stevens

[11] Patent Number: 5,826,370
[45] Date of Patent: Oct. 27, 1998

[54] APPARATUS FOR USE IN APPLYING LIQUIDS, SUCH AS FOR TREATING PLANTS

[75] Inventor: Alec Martin Stevens, Brisbane, Australia

[73] Assignee: Weedbug Pty. Ltd., Brisbane, Australia

[21] Appl. No.: 737,472

[22] PCT Filed: May 17, 1995

[86] PCT No.: PCT/AU95/00293

§ 371 Date: Nov. 12, 1996

§ 102(e) Date: Nov. 12, 1996

[87] PCT Pub. No.: WO95/31607

PCT Pub. Date: Nov. 23, 1995

[30] Foreign Application Priority Data

May 17, 1994 [AU] Australia ................. PM5692

[51] Int. Cl.⁶ .................. E01H 11/00; A01M 21/04
[52] U.S. Cl. ............................. 47/1.5; 239/172
[58] Field of Search ..................... 239/732, 172, 239/165–168; 56/DIG. 13, 13.5; 47/14.1, 1.5

[56] References Cited

U.S. PATENT DOCUMENTS

| | | | |
|---|---|---|---|
| 2,602,684 | 7/1952 | Pinke | 239/168 X |
| 2,753,675 | 7/1956 | Cunningham | 56/13.5 |
| 3,070,938 | 1/1963 | Winget | 56/14.1 |
| 3,412,938 | 11/1968 | Larson | 239/168 X |
| 4,199,896 | 4/1980 | Lehman | 239/165 X |
| 4,310,988 | 1/1982 | Porter, Jr. | 239/145 X |
| 4,315,602 | 2/1982 | Kubacak et al. | 239/165 X |
| 4,709,857 | 12/1987 | Wilger | 239/167 X |
| 5,012,635 | 5/1991 | Walters | 56/13.6 |
| 5,178,328 | 1/1993 | Broyhill | 239/167 |
| 5,310,116 | 5/1994 | Broyhill | 239/288 X |
| 5,348,226 | 9/1994 | Heiniger et al. | 239/168 X |
| 5,398,874 | 3/1995 | Dailey | 239/288 |
| 5,520,335 | 5/1996 | Claussen et al. | 239/168 X |

FOREIGN PATENT DOCUMENTS 203771  10/1957  Australia ................. 239/167

Primary Examiner—Kevin Weldon
Attorney, Agent, or Firm—Abelman, Frayne & Schwab

[57] ABSTRACT

There is provided apparatus for use in applying a treating liquid chemical to surfaces at or adjacent a longitudinal channel and including a first chemical applicator assembly (11) and a second assembly (10) mounted on a frame (31) adapted to be connected to and extend from one side of a tractor (9) or other conveyance whereby the applicator assemblies (11, 10) may be drawn along said surfaces and raised or lowered in use, each applicator assembly having an applicator head (14, 13) for supplying said liquid chemical and being mounted on a support housing (17, 16) having wheel means (21) therebeneath, the support housing (16) of the second applicator assembly (11) being further from the tractor (9) than the other and the two being hingedly interconnected and tiltable relative to the frame (31) and to each other about parallel longitudinal axes for treating adjacent parallel surfaces which are not co-planar, each support housing (17, 16) being mounted on its said wheel means (21) in such manner that the latter will engage the surface therebeneath to prevent the applicator assemblies (11, 10) being damaged by uneven or harsh terrain over which the wheel means (21) may pass during motion of the tractor.

10 Claims, 3 Drawing Sheets

APPARATUS FOR USE IN APPLYING LIQUIDS, SUCH AS FOR TREATING PLANTS

TECHNICAL FIELD OF THE INVENTION

This invention relates to apparatus for use in applying liquids, such as for treating plants, and it has particular but not exclusive reference to known types of apparatus such as a ropewick applicator for applying herbicides and the like to annual and perennial weeds by a rotary wiping action.

BACKGROUND ART

One very successful form of apparatus of the ropewick applicator type is that sold under the registered trade mark "WEEDBUG", the subject of Australian Patent No. 589361, International Application No. PCT/AU95/00065, and South African Patent Application No. 95/1171, and it is to be understood that all the descriptions of practical embodiments therein are to be deemed part of the disclosure herein to the extent that the same may be found necessary or desirable. The earlier patent specifications show use of the applicator for purposes such as applying weed-killing chemicals up to and around tree trunks, being operable in even windy conditions and also operable under low hanging trees, using a single applicator rotor, or two or more when desired. It was also pointed out that the machines could be used most effectively along fencelines, road or pond edges, and in open areas requiring weed control.

Typically the machines of our Australian Patent No. 589361 use ropewick application from rotating discs or rotors fitted to adjustable arms extending from a tractor, for example, whereby the disc or rotor speed controls the chemical flow. Each rotor has means whereby it may be rotated about an axis disposed substantially vertically in use and having a bottom disc through which the wick means extend for operation therebeneath, there being in practice a plurality of equally spaced wicks passing sealably through apertures in the disc from an annular or other axially mounted reservoir above the disc and rotatable therewith. In the said patent specification, FIGS. 1 and 3 of the drawings show basic requirements for the reservoir, while FIG. 4 shows an annular structure using the disc itself as a lower part of the reservoir, it being thus apparent that various forms of "rotating" reservoir may be used, and the wick means can be of desired type, preferably of rope-like form and provided in any desired number in radially spaced arrangement.

Success attained by using the aforementioned applicators has prompted us to consider applying the principles to overcoming other problems which have come to our attention. For example, local authorities and other bodies or individuals currently spend considerable time and monies on spraying weeds located in and at the edges of roadside curbs and channels. This is usually achieved by driving a tractor or the like alongside the curb and channel, such as beside a median strip, or the curb only in instances where it has no associated channel, and directing weedicide at all pertinent areas. It is the claim of environmentalists that less than ten percent of the spray is effectively utilised, with the remainder being undesirably absorbed into the soil or being drained away into the drainage systems where the adverse effects of the chemicals may manifest themselves in many different ways. Thus it will be apparent that the spraying of curb and channel in this way is unnecessarily expensive and somewhat wasteful and indiscriminate

OBJECTS OF THE INVENTION

The present invention has been devised with the above problems in mind, and it has for its principal object the provision of novel apparatus whereby curbs, channels and edge areas associated therewith may be treated with chemicals more efficiently and at less cost than currently achieved. Another object of the invention is to provide apparatus as aforementioned which will be effective in treating different slopes and levels associated with such curb and channel situations. In particular the present invention aims to provide novel apparatus of the type stated which will enable treatment to be effected by a wick wiper system of the types set out above. A number of other objects and advantages of the invention will be apparent from the descriptions herein.

Where the invention is described or defined herein in relation to treating a channel it is to be understood that the word "channel" embraces not only longitudinally extending grooves according to normal usage of the word, but also areas adjacent to curbs or median strips, with or without an actual groove, and including edge strips of roads bordering on channels, or curbs and channels, or median strips.

DISCLOSURE OF THE INVENTION

With the foregoing and other objects in view, our invention resides broadly, according to one aspect, in apparatus for use in applying a treating liquid chemical to surfaces at or adjacent a longitudinal channel, said apparatus including first and second chemical applicator assemblies mounted on a frame adapted to be connected to and extend from is one side of a tractor or other conveyance whereby the applicator assemblies may be drawn along said surfaces and raised or lowered in use, each applicator assembly having an applicator head for supplying said liquid chemical and being mounted on a support housing having wheel means therebeneath, the support housing of the second applicator assembly being further from the tractor than the other and the two being hingedly interconnected and tiltable relative to the frame and to each other about parallel longitudinal axes for treating adjacent parallel surfaces which are not co-planar, each support housing being mounted on its said wheel means in such manner that the latter will engage the surface therebeneath to prevent the applicator assemblies being damaged by uneven or harsh terrain over which the wheel means may pass during motion of the tractor.

In a preferred embodiment of the invention, the first applicator assembly has its support housing hingedly connected to the frame, while the second applicator housing is hingedly connected to the first support housing in such manner that it may he supported thereby upon lifting the frame but is also tiltable about an axis which is movably spaced from the first support housing. In that embodiment, preferably the second or outer applicator assembly is pivotally connected to the first applicator assembly by means of a sub-frame adapted to lie on the first support housing or to be moved hingedly above and clear of the first support housing, said sub-frame having its outer edge pivotally connected to the inner side of the second support housing, while said sub-frame has its inner edge pivotally connected to the outer side of the first support housing about the interconnecting hinge axis therebetween, the latter permitting lifting of the sub-frame to lift the outer applicator assembly for treating a surface higher than a substantially horizontal channel surface, such as a vertical surface, inclined surface or elevated horizontal surface of a curb strip, median strip, or curb and channel structure.

In most instances, there will preferably be provided a third applicator assembly having an applicator head mounted on a support housing with wheel means therebeneath, the third applicator assembly being an the tractor side of the first applicator assembly to constitute the innermost applicator assembly and having its outer edge pivotally connected to the inner edge of the first applicator assembly so that the latter then constitutes the middle applicator assembly, all three applicator assemblies being tiltable about parallel longitudinal axes so as to be usable in treating three surfaces of various slopes. In such constructions, suitably the three applicator assemblies are mounted on the frame in stepped or offset formation longitudinally, the second applicator assembly being slightly ahead of the first applicator assembly, and the latter being slightly ahead of the third applicator assembly along the direction of motion of the apparatus. Preferably too, the degree of pivotal movement of adjacent applicator assemblies is predetermined and controlled by retaining chains or equivalent stop means, or spring-loaded buffer means.

So far as the supporting wheels are concerned, preferably the wheel means of each applicator assembly comprises a set of wheels on an axis transverse to the line of motion at each end of each support housing, each set of wheels having separate, spaced and independently-rotatable wheels, while the leading end of the support housing furthermost from the tractor has further sets of wheels arranged in sloped formation to cause pivotal lifting of the furthermost support housing if an obstacle is encountered.

The frame may be of desired form but preferably includes an applicator-supporting sub-frame mounted in guided sliding manner on a main frame adapted to be attached to the tractor, spring means being provided to connect the sub-frame and main frame in such manner that the sub-frame is normally urged away from the tractor towards the channel but will be moved slidably towards the tractor against the action of the spring means in the event of the applicator assemblies being pressed by an obstacle or a curb or the like The apparatus is easily usable with applicators as disclosed in my earlier specifications, and it is thus preferred that each applicator head is of the ropewick type, each support housing carrying bearings for a normally vertical shaft having a lower disc fitted with a number of rope wicks to receive and dispense chemical from an upper annular coaxial container rotatable therewith, each support housing having a drive motor drivably connected to the respective vertical shaft. As a useful design feature, suitably the second or outer applicator assembly is fitted with deflector means at its leading end for deflecting away from the second applicator head any excess foliage or bothersome obstructions. Other features of the invention will be hereinafter apparent.

BRIEF DESCRIPTION OF TEE DRAWINGS

In order that the invention may be more readily understood and put into practical effect, reference will now be made to the accompanying drawings, wherein.

Figure 1:
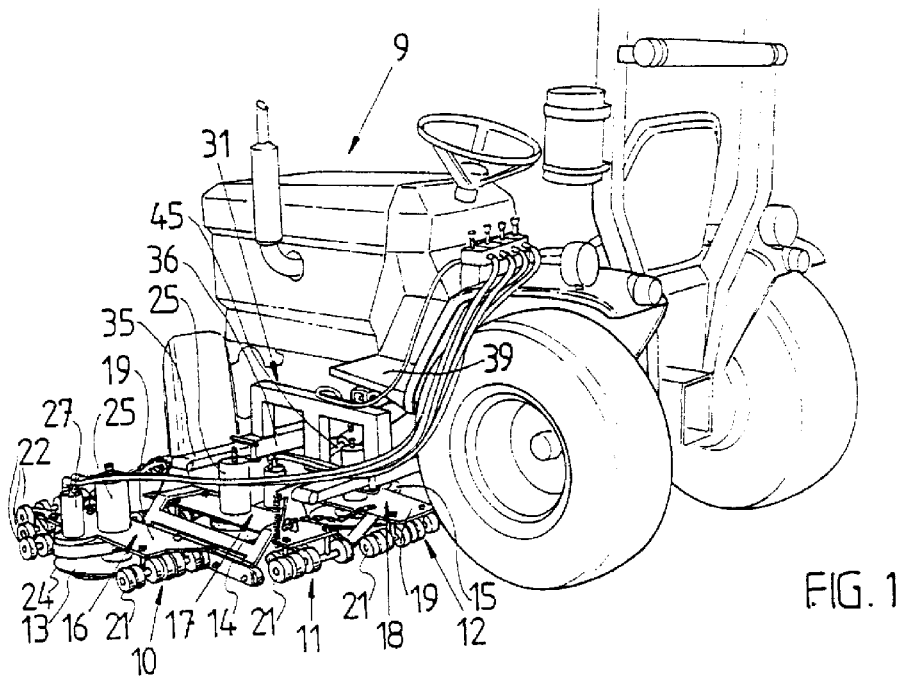
FIG. 1 is a perspective view from the side and rear showing one side of a tractor to which the apparatus according to the invention has been fitted to extend away from the side of the tractor towards a strip along which the apparatus can be drawn and can be raised or lowered by the tractor.

The machine shown in the drawings has three similar applicator assemblies comprising a middle or first assembly 11, an outermost or second assembly 10, and an innermost or third assembly 12, the inner assembly 12 being adapted to traverse the road edge, while the middle assembly 11 will normally traverse the channel base, and the outer assembly 10 will traverse the inner curb face or a raised horizontal or sloped curb face. Each applicator assembly 10, 11 and 12 has an applicator head 13, 14 and 15 respectively, rotatable beneath a respective supporting housing 16, 17 and 18.

Each support housing 16, 17 and 18 has a horizontal top frame plate 19 extending in the direction of the line of motion of the tractor 9 and having at each end downwardly extending supporting arms 20 for end wheels 21 which are all of the same size and diameter but spaced along transverse horizontal axes so that they are independently rotatable and act to support the applicator heads 13, 14 and 15 above the ground so that they will not be damaged by rough terrain which may be traversed, and at the same time the wheels will facilitate turning or changing direction without scuffing or skidding. It will thus be seen that there are six sets of supporting wheels 21, while additionally the front end of the outermost support housing 16 has additional wheels 22 on transverse axes lying in an upwardly and forwardly inclined plane so that the housing 16 will be urged upwards when the wheels 22 encounter an obstacle or a transverse portion of gutter structure.

Each of the three frame plates 19 has medial bearings to support a vertical shaft rotatable about axis 23 and secured at its lower end to a rotor disc 24 constituting the operative part of the applicator head 13, 14 or 15, each disc 24 having thereunder equally spaced rope wicks (not shown) extending more or less radially from a central reservoir which connects with an axial upper reservoir in housing 26 and rotatable with the shaft on axis 23 with an upper bearing. Also mounted on each frame plate 19 is an hydraulic motor 27 deriving power from the tractor hydraulic system and having a pulley wheel below the plate 19 for connection by a belt to a similar pulley wheel on the said shaft for driving same about axis 23.

Figure 5:
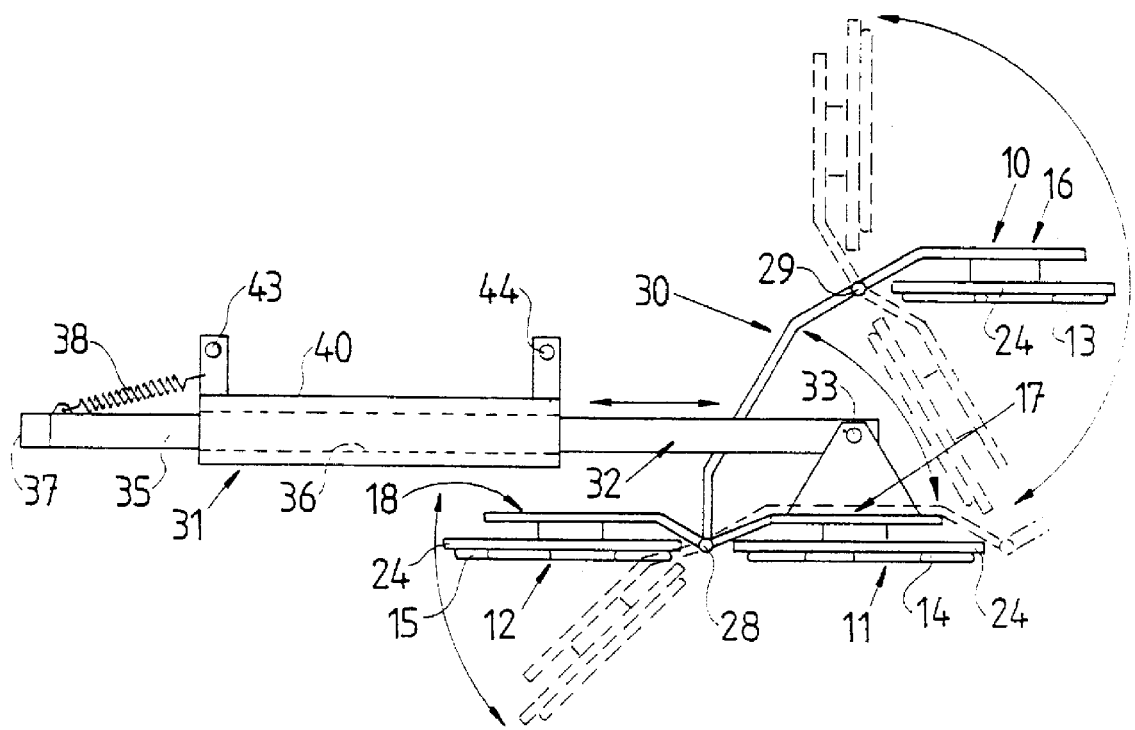
FIG. 5 is a diagrammatic front elevation of the laterally extending frame and the longitudinally extending pivot axes for the applicator assemblies.

The first and third applicator assemblies 11 and 12 at the middle and inner sides are hingedly interconnected by aligned longitudinal pivot pins and pivot sleeves and are releasable when securing nuts are unscrewed, the connection axis being indicated at 28 in FIG. 5 which shows all connections and basic components diagrammatically. On the other hand, the outermost applicator assembly 10 adjacent the curb has similar pivot pin and sleeve connections but is hingedly connected about axis 29 to the outer edge of a sub-frame 30 which at its inner edge is hingedly connected about the same longitudinal axis 28 as for the hinged connection between the applicator assemblies 11 and 12.

Figure 2:
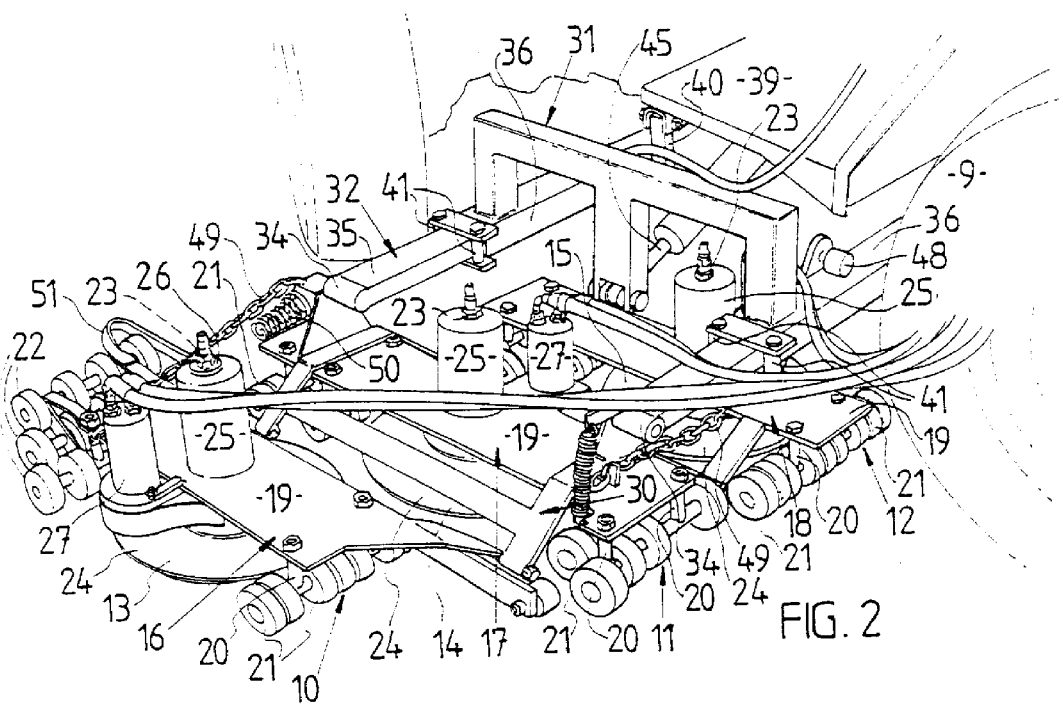
FIG. 2 is a perspective view corresponding to FIG. 1 and to larger scale to show the apparatus in greater detail.
Figure 3:
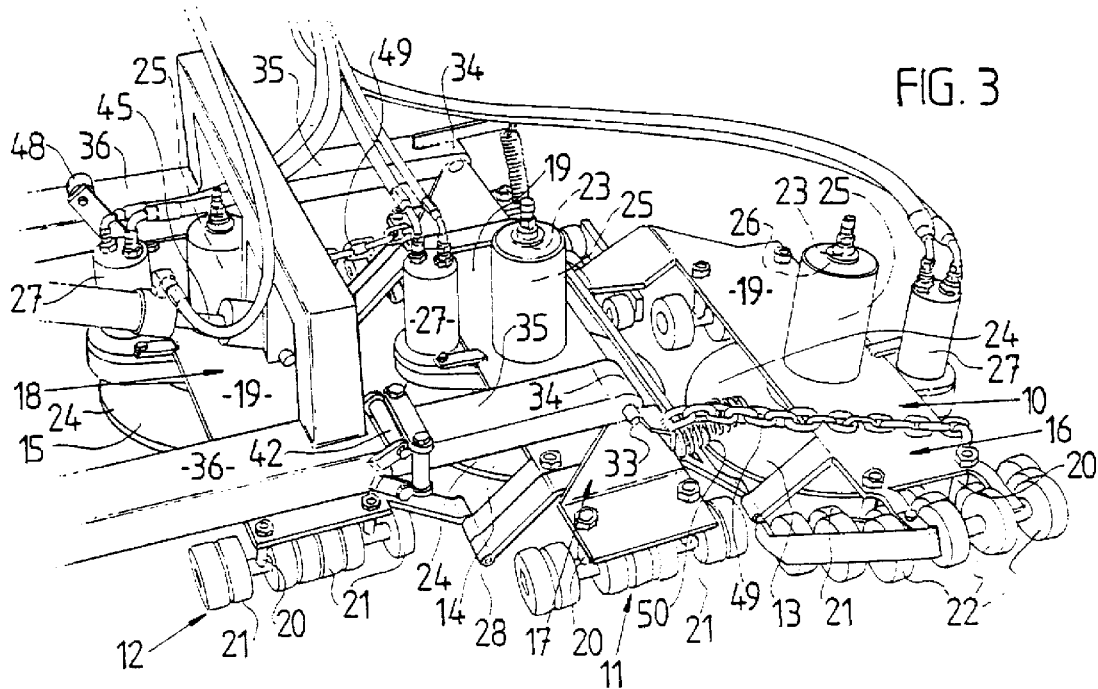
FIG. 3 is a perspective view from the front and above showing further details of the treating apparatus of FIGS. 1 and 2.
Figure 4:
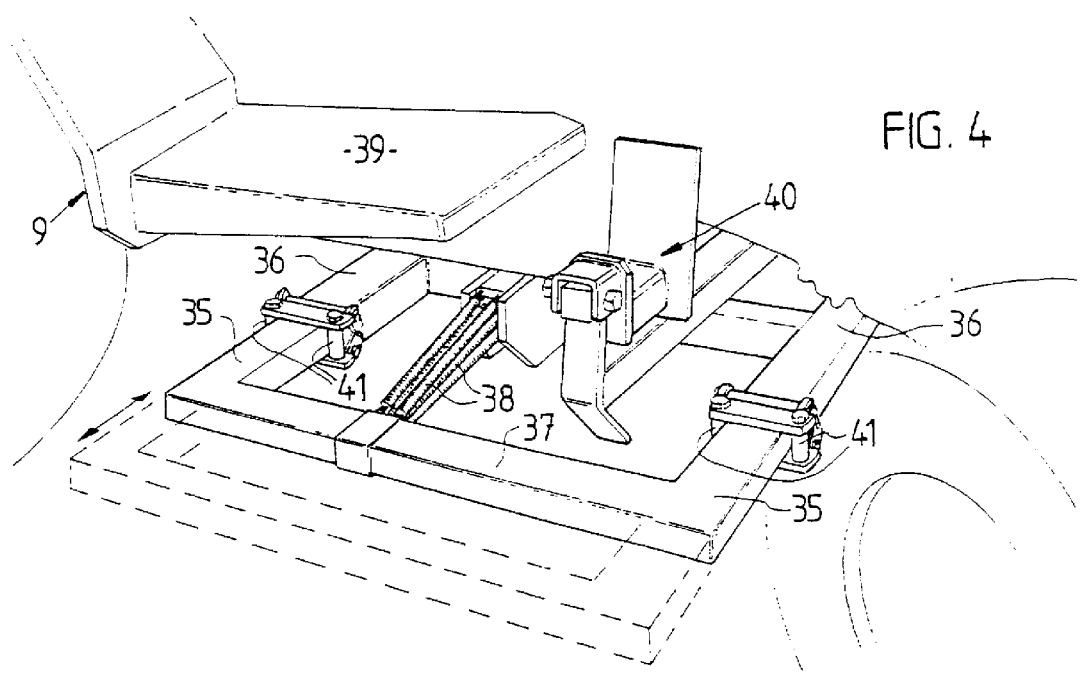
FIG. 4 is a fragmentary and diagrammatic perspective view of pare of the apparatus, viewed in an outward direction from the tractor and showing the frame made up of a sub-frame and a main frame.

The applicator assemblies are mounted on a frame indicated generally at 31 and including a slidable sub-frame 32 to which the middle applicator assembly 11 is hingedly connected about a longitudinal axis 33 at the spaced pivot lugs 34 shown in FIGS. 2 and 3, the sub-frame 32 having arms 35 slidable in sleeves 36 and interconnected at their inner ends by a bar 37 which is urged by tension springs 38 in an outward direction towards the curb or channel. FIG. 4 shows in fragmentary view parts of the tractor 9 such as the footboard 39 and mounting portion 40 of the tractor so that the main frame portion of the frame 31 may be secured to the tractor. Vertical guide rollers 41 and horizontal guide rollers 42 are also shown, these ensuring easy sliding of the sub-frame 32 within the main portion 40. The supporting frame 31 is adapted to be hinged to the tractor as shown at hinge axis 43 in FIG. 5 which also shows the lifting axis 44 at which an hydraulic cylinder and ram 45 are connected for raising and lowering the apparatus as shown in FIGS. 2 and 3.

In use, when inoperative and on a flat surface such as a road, all three applicator assemblies 10, 11 and 12 will have their applicator discs 24 coplanar, with the axes of all wheels 21 also being coplanar, the three assemblies being parallel but offset as apparent from the drawings, the outer assembly 10 being slightly ahead of the middle assembly 11 which is slightly ahead of the inner assembly 12. Simple relative folding for hinging purposes can take place between the assemblies 11 and 12, but the parallel hinging axis between units 10 and 11 can be raised as desired in addition to affording simple hinging.

FIG. 5 shows how the middle assembly 11 can tilt about axis 33 to follow a channel surface, while the inner assembly 12 is tiltably connected thereto about axis 28 to follow the adjacent road surface. Free falling of the assembly 12 when the apparatus is lifted is prevented by a retaining roller over the frame as denoted at 48 in FIG. 2. FIG. 5 shows how the outer assembly 10 tilts about its adjacent axis and also tilts about the sub-frame 30 so that the applicator disc 24 can be horizontal, vertical or at any slope and also at any appropriate height according to the curb-type member being treated. The offset relationship between assemblies also allows for tilting of the top reservoir of the assembly 10 to be accommodated between the reservoir and hydraulic motor of the middle assembly 11 when the rotor axis is brought back to horizontal.

Chains 49 are provided as illustrated for holding the assemblies when being carried in raised attitude by the tractor, with buffer springs such as the spring 50 also ensuring smoothness in all actions, the chains 49 being releasable at one end if desired and also acting for adjustment purposes. Other design refinements may be provided such as deflector bars 51 at the "leading" edges where matted grass or other bothersome items are encountered and need to be deflected, such as heavy volume grass. Also rotatable discs may be advantageous near the trailing end of the middle assembly 11 to engage in the angle of curb and channel to prevent wedging or binding.

It will be apparent from the drawings that each applicator assembly may be operated in the same manner as described in the aforementioned original patent specification for ropewick application of chemicals to any plants which may be encountered, the machine being easily connected to standard control mechanisms for tractors or the like so that the apparatus can be carried to and operated along a strip to be treated, with the three applicator assemblies disposed at requisite angles adjacent the road edge and channel, while the outermost unit can be both at any angle and at any desired height. The chemicals will be accurately and adequately placed without wastage so that the main object of the invention will be achieved, the wheels ensuring that the applicator heads or discs do not encounter harsh terrain over which the apparatus might pass and thus not being subject to accidental damage.

While apparatus as described and illustrated will therefore be found very effective in achieving the objects for which the invention has been devised, it will be understood that many further modifications of constructional detail and design may be made, as will be apparent to persons skilled in the art, without departing from the broad scope and ambit of the invention as defined by the appended claims.

I claim:

1. Apparatus for use in applying a treating liquid chemical to surfaces at or adjacent a longitudinal channel, said apparatus including:
   a frame assembly adapted to be connected to a vehicle and to be raised and lowered in use;
   first and second chemical applicator assemblies mounted to said frame assembly, each said applicator assembly having an applicator support housing and wheel means depending therefrom for supporting said applicator support housing on or against the surface to be treated and an applicator head operatively mounted to said applicator support housing for applying said liquid chemical, said first applicator assembly being operatively connected to said frame assembly for pivotal movement about a first longitudinal axis extending in the direction of travel and said second applicator assembly being operatively connected to said frame assembly by link means for orbital movement about a second longitudinal axis wherein said second applicator assembly may move up and down relative to said first applicator assembly from a first disposition in which said second applicator assembly is adjacent said first applicator assembly and lies in the same plane and a second disposition in which said second applicator assembly is above said first applicator assembly, said second applicator assembly being operatively connected to said link means for pivotal movement relative thereto about a third longitudinal axis whereby said first and second applicator assemblies are adapted to be drawn along non-parallel surfaces such that liquid chemical may be applied thereto.

2. Apparatus according to claim 1, wherein said first applicator assembly is operatively connected to said frame assembly via said first applicator support housing and said second applicator assembly is operatively connected to said frame assembly by means of a sub-frame assembly which is pivotally connected to said first applicator support housing, said second longitudinal axis being the axis of the pivotal connection and said sub-frame assembly being adapted to engage with said first applicator support housing to limit downward orbiting movement of said second applicator assembly about said second longitudinal axis.

3. Apparatus according to claim 2, wherein said third longitudinal axis is on a side of said first applicator support housing remote from said second applicator assembly and said sub-frame assembly is adapted to engage with an upper face of said first applicator support housing when said second applicator assembly is in a lowered disposition whereby raising of said first applicator assembly is effective to raise said sub-frame and said second applicator assembly.

4. Apparatus according to claim 2, including a third applicator assembly having a third applicator support housing and wheel means depending therefrom for supporting said third applicator support housing on a surface to be treated and an applicator head operatively mounted to said third applicator support housing for supplying the liquid chemical, said third applicator assembly being operatively connected to said first applicator assembly for pivotal movement relative thereto about said third longitudinal axis and said third applicator assembly being adjacent said first applicator assembly on a side opposite said second applicator assembly.

5. Apparatus according to claim 4, wherein said first, second and third applicator assemblies are operatively connected to said frame in stepped or offset formation in the direction of travel, said second applicator assembly being slightly ahead of said first applicator assembly, and said first applicator assembly being slightly ahead of said third applicator assembly.

6. Apparatus according to claim 1, wherein the degree of pivotal movement of adjacent applicator assemblies is limited by stop means, selected from chains or spring-loaded buffer means.

7. Apparatus according to claim 1, wherein said wheel means of said first and second applicator assemblies includes a set of wheels rotatably mounted on axes transverse to the direction of travel of the vehicle at the leading and trailing ends of each applicator assembly support housing, each set of wheels having separate, spaced and independently-rotatable wheels, and the leading end of said second applicator assembly support housing including sets of wheels arranged in planes one above another in sloped formation whereby said second applicator assembly may be caused to lift by orbiting or pivoting movement, or orbiting and pivoting movement, about said second or third longitudinal axis, or said second and third longitudinal axes, upon contacting an obstacle.

8. Apparatus according to claim 1, wherein said frame assembly includes a main frame adapted to be connected to the vehicle and an applicator-supporting sub-frame slidably mounted to said main frame for movement from a retracted position to an extended position, and spring means connected to said main frame and said applicator-supporting sub-frame towards the extended position.

9. Apparatus according to claim 1, where in each applicator assembly includes an applicator head rotatably mounted on a shaft supported in bearings secured to its respective applicator support housing for normal rotation about a vertical axis and a drive motor drivably connected to said shaft, each said applicator head including a plurality of rope wicks adapted to receive and dispense chemical from an upper annular container mounted on said housing for rotation with said applicator head.

10. Apparatus according to claim 1, wherein said second applicator assembly is fitted with deflector means at its leading edge for deflecting away from the second applicator head excess foliage or obstructions.

* * * * *